US010537092B2

(12) United States Patent
Tarbouriech et al.

(10) Patent No.: US 10,537,092 B2
(45) Date of Patent: Jan. 21, 2020

(54) OYSTER FARMING METHOD

(71) Applicant: Medithau, Marseillan (FR)

(72) Inventors: Florent Tarbouriech, Sete (FR); Jean-Jacques Thibaut, Carnon (FR)

(73) Assignee: Medithau, Marseillan (FR)

( * ) Notice: Subject to any disclaimer, the term of this patent is extended or adjusted under 35 U.S.C. 154(b) by 536 days.

(21) Appl. No.: 15/304,897

(22) PCT Filed: Apr. 15, 2015

(86) PCT No.: PCT/FR2015/051024
§ 371 (c)(1),
(2) Date: Oct. 18, 2016

(87) PCT Pub. No.: WO2015/159025
PCT Pub. Date: Oct. 22, 2015

(65) Prior Publication Data
US 2017/0071170 A1 Mar. 16, 2017

(30) Foreign Application Priority Data
Apr. 18, 2014 (FR) ...................... 14 53555

(51) Int. Cl.
*A01K 61/54* (2017.01)
(52) U.S. Cl.
CPC .................. *A01K 61/54* (2017.01)
(58) Field of Classification Search
CPC .................. A01K 61/54–57; Y02A 40/822
USPC ............................... 199/234–244
See application file for complete search history.

(56) References Cited

U.S. PATENT DOCUMENTS

| 3,418,138 A * | 12/1968 | Dennis | A22C 29/043 119/243 |
| 4,186,687 A * | 2/1980 | Gilpatric | A01K 61/54 119/241 |
| 2003/0094141 A1* | 5/2003 | Davis | A01K 61/54 119/234 |
| 2008/0017125 A1* | 1/2008 | Power | A01K 63/04 119/200 |
| 2010/0263600 A1* | 10/2010 | Lebrun | A01K 67/033 119/234 |
| 2013/0186345 A1* | 7/2013 | Leslie | A01K 61/54 119/240 |

FOREIGN PATENT DOCUMENTS

AU 2004100617 A4 9/2004
WO WO 2011/123895 A1 10/2011

OTHER PUBLICATIONS

Abstract of French Patent—FR2963539 dated Dec. 10, 2012, 2 pages.

(Continued)

*Primary Examiner* — Tien Q Dinh
*Assistant Examiner* — Brady W Frazier
(74) *Attorney, Agent, or Firm* — Dority & Manning, P.A.

(57) ABSTRACT

The invention relates to an oyster farming method comprising at least one cultivation step (200) wherein periods of immersion are alternated with periods of mechanical dewatering of the oysters, the mechanical dewatering periods lasting between 3 hours and 48 hours, and an immersion period between two periods of mechanical dewatering lasting between 3 hours and seven days.

9 Claims, 1 Drawing Sheet

(56) References Cited

OTHER PUBLICATIONS

Figure 1:
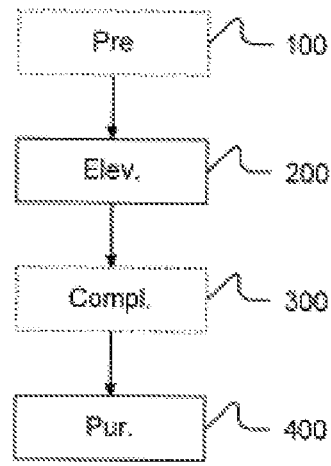

Rodriguez et al., "*Tropical Mangrove Oyster Production from Hatchery-Raised Seed in Cuba*," Journal of Shellfish Research, vol. 11, No. 2, 1992, pp. 455-460.
International Search Report for PCT/FR2015/051024 dated Sep. Jul. 10, 2015, 3 pages.
Abstract of French Patent—FR1003249 dated Mar. 17, 1952, 1 page.

* cited by examiner

OYSTER FARMING METHOD

CROSS REFERENCE TO RELATED APPLICATION

This application is the national stage entry of International Patent Application No. PCT/FR2015/051024 having a filing date of Apr. 15, 2015, which claims priority to and the benefit of French Patent No. 1453555 filed in the French Intellectual Property Office on Apr. 18, 2014, the entire contents of which are incorporated herein by reference.

The invention relates to the field of oyster farming.

Oyster farming is a complex, traditional field that has evolved little over time. Generally speaking, oysters are cultivated in pockets submerged in a natural medium. According to the place of cultivation, oysters may undergo dewatering due to tide cycles, and such dewatering has a negative impact on the speed of growth of the animals. Moreover, depending on the location of cultivation sites, oysters are not totally uncovered at low tide and thus do not suffer the effect or impact of total dewatering.

Certain techniques make provision for reasonably regular dewatering for a few minutes with a view to eliminating epibionts. Other techniques make provision for a limited number of dewatering episodes (fewer than ten) at the end of cultivation, in order to accustom the oysters to life on a display stall. Aside from these particular applications, dewatering is perceived as a hindrance that slows down the growth of the oysters.

The Applicant has done extensive research to develop a form of oyster farming that is less dependent on uncontrollable parameters such as the wind, the swell, the tide cycle and other weather parameters, with which production is higher in quality and more regular in terms of quality. It has thus discovered that, contrary to received opinion, regular, controlled dewatering allows enhanced oyster quality.

To that end, the invention proposes an oyster farming method, comprising at least one cultivation step comprising alternating periods of immersion and periods of mechanical dewatering of oysters, wherein the periods of mechanical dewatering last between 3 hours and 48 hours, and a period of immersion between two periods of mechanical dewatering lasts between 3 hours and seven days.

This method is advantageous because it allows the oysters to develop a higher filling rate, a larger adductor muscle, a greater thickness of mother of pearl, and a thicker shell, owing to the cycles of mechanical dewatering.

According to variants of the invention, the device may include the following characteristics:
  the periods of mechanical dewatering last between 12 hours and 24 hours,
  a period of immersion between two periods of mechanical dewatering lasts between one day and seven days,
  the cultivation step comprises a succession of substeps lasting a total of between approximately ten months and forty-eight months, and in each of which the duration of a period of immersion between two periods of mechanical dewatering is adapted to the climate of the place of cultivation,
  the climate of the place of cultivation is a Mediterranean climate, and the duration of a period of immersion between two periods of mechanical dewatering of each substep is chosen as follows:
    a. for a first substep, between four days and seven days, then
    b. for a second substep, between three days and five days, then
    c. for a third substep, between one day and three days, then
    d. for a fourth substep, between three days and four days,
  the substeps are repeated in the same order,
  the cultivation step takes place over a total period of between ten months and eighteen months,
  the duration of a period of immersion between two periods of mechanical dewatering is extended when one or more of the following conditions is or are met:
    rain and/or storm,
    wind above 30 knots,
    below 20% sunshine.
  a refining step takes place after the cultivation step, wherein periods of immersion take place such that the oysters are located at a depth of between 10 cm and 30 cm below the surface.

Figure 2:
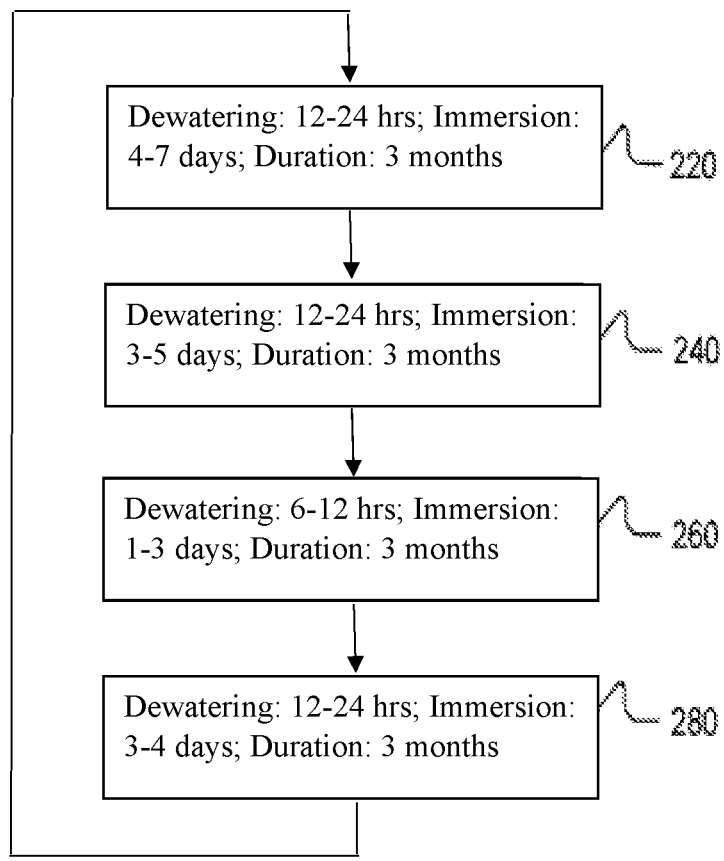

Further features and advantages of the invention will become more apparent from reading the following description, based on examples given by way of non-limiting illustration and on the basis of the drawings, in which:

FIG. 1 shows a general scheme for an oyster farming method according to the invention, and FIG. 2 shows an illustrative embodiment of a step in the method of FIG. 1.

The drawings and the description below essentially include elements of a definite nature. They may thus not only serve for a better understanding of the present invention but also contribute to its definition, if appropriate.

FIG. 1 shows a general scheme of an oyster farming method according to the invention. This method comprises four steps, two of which are optional and represented in broken lines.

In a first, optional step 100, diploid or triploid spats are received and undergo preliminary maturation. At this stage, the oysters have a size of between approximately 4 mm and 8 mm. The duration of step 100 is between four and twelve months.

This preliminary maturation may take place, for example, by cultivation while suspended in a natural medium, for example on structures out of the water, constructed in accordance with patent FR1003249, or any other type of standard structure, on a cultivation support of Japanese lantern or Australian basket type, or a plastic pocket of 2 mm to 8 mm mesh or "pearl net" type (a series of pyramid-shaped pockets made from netting that are arranged in lines over a depth of 2.5 m, ballasted by a weight at the bottom). Preferably, the periods of immersion take place such that the oysters are at a depth of between 10 cm and 30 cm below the surface. This makes it possible to achieve the effect of "wave rolling", by virtue of which the waves cause the oysters to rub against one another, which polishes their surface. Given these variants, there is typically a density of approximately 400 to 500 mollusks per pocket.

During this preliminary maturation step, provision is made for an alternation of periods of immersion and periods of mechanical dewatering. Mechanical dewatering is understood to mean any technical method, as opposed to natural dewatering, by means of which the oysters are brought out of the water and kept in the air. In the example described here, the periods of mechanical dewatering take place once a week, for a duration of between 15 hours and 24 hours. This alternation of periods of immersion and periods of mechanical dewatering takes place for a total duration of between four months and twelve months.

In a second step 200, the mollusks that have undergone preliminary maturation in step 100, or that are aged from six months to eighteen months when step 100 is omitted, undergo specific cultivation. At this stage, the oysters have a size of between approximately 15 mm and 80 mm.

Cultivation takes place in suspension in a natural medium on structures out of the water constructed in accordance with patent FR1003249, or any other type of standard structure, on a cultivation support comprising a wooden bar of square cross section, the dimensions of which are 2450×40 mm. In a variant, the cultivation support may be a PVC strip with the dimensions of 2700×80 mm, a polypropylene net 15 cm wide and 2.5 m high, or, alternatively, a rope from 3 to 5 mm in diameter. In each case, the oysters are attached to the support individually. Attachment makes it possible to control the cultivation density, which allows better control of the form grading and better control of disease-propagation risks. The dimensions of these elements and the method of affixing to the support may vary, depending on the cultivation site. Lastly, each support is ballasted by a weight at the bottom. In a variant, cultivation may take place with the means described above in step 100.

In step 200, the periods of mechanical dewatering each last between 3 hours and 48 hours and, preferably, between 12 hours and 24 hours. Moreover, a period of immersion between two periods of mechanical dewatering lasts between 3 hours and seven days and, preferably, between two days and seven days. The total duration of the cultivation step is generally between ten months and forty-eight months. All the durations mentioned in this paragraph may be adapted to suit the cultivation cycle, the place of cultivation, the climate of said place and the changing seasons.

FIG. 2 shows an illustrative embodiment of step 200 within the context of a Mediterranean climate, for cultivating oysters in the Thau basin.

In this illustrative embodiment, cultivation is a repetition of successive substeps over a total duration of ten to eighteen months, within the context of cultivating a first variety of oysters.

The cultivation step cycle comprises four substeps:
  in a first sub step 220, the periods of mechanical dewatering last between 12 hours and 24 hours, a period of immersion between two periods of mechanical dewatering lasts between four days and seven days, and the total duration of this substep is approximately three months, typically from winter through spring,
  in a second substep 240, the periods of mechanical dewatering last between 12 hours and 24 hours, a period of immersion between two periods of mechanical dewatering lasts between three days and five days, and the total duration of this substep is approximately three months, typically from spring through summer,
  in a third substep 260, the periods of mechanical dewatering last between 6 hours and 12 hours, a period of immersion between two periods of mechanical dewatering lasts between one day and three days, and the total duration of this substep is approximately three months, typically from summer through fall,
  in a fourth substep 280, the periods of mechanical dewatering last between 12 hours and 24 hours, a period of immersion between two periods of mechanical dewatering lasts between three days and four days, and the total duration of this substep is approximately three months, typically from fall through winter.

When the fourth substep 280 is completed, the cycle resumes with substep 220 until the cultivation step is completed.

In a variant, the immersion period may be extended when weather conditions are unfavorable. Thus, a period of mechanical dewatering may be extended until favorable weather conditions once again obtain. Conditions that extend immersion may include one or more of the following conditions:
  rain and/or storm (in order to prevent exposure of the oysters to fresh water),
  wind above 30 knots (in order to prevent the oysters being damaged by one another, through impact due to the wind),
  less than 20% sunshine (to allow mechanical dewatering based on solar energy and to permit solar radiation to have an impact on shell calcification).

Similarly, when one or more of the above conditions arise in the course of a period of mechanical dewatering, this period is cut short, and the substep goes on in the same manner, as if the period of mechanical dewatering had taken place in whole.

When one or more periods of dewatering are extended owing to one of the above causes, the total duration of each substep remains unchanged. There are thus fewer mechanical dewatering episodes, which may be offset for example by repeating a substep, or optionally not offset.

The example of FIG. 2 may be used within the context of cultivating a second variety of oysters. In this case, the total duration of the cultivation step 200 is between eighteen and forty-eight months.

When mechanical dewatering is not based on solar energy, the cultivation step 200 may include three substeps instead of the four presented above:
  a first substep, the mechanical dewatering periods last between 12 hours and 24 hours, a period of immersion between two periods of mechanical dewatering lasts between three days and five days, and the total duration of this substep is approximately six months, typically from winter through summer,
  in a second substep, the mechanical dewatering periods last between 6 hours and 12 hours, a period of immersion between two periods of mechanical dewatering lasts between one day and three days, and the total duration of this substep is approximately three months, typically from summer through fall,
  in a third substep, identical to the first substep, typically from fall through winter.

Once the cultivation step 200 has been completed, a third, refining step 300, also called a cultivation supplement, may take place.

The refining step 300 takes place, for example, within the context of farming the first variety of oysters. At this stage, the oysters are adults and in this variety weigh between 45 g and 85 g.

The refining step 300 comprises an alternation of periods of immersion and periods of mechanical dewatering. In this case, immersion takes place in suspension in a natural medium.

The focus of this step is two-fold:
  first, the periods of immersion take place such that the oysters are located at a depth of between 10 cm and 30 cm below the surface. This makes it possible to achieve a "wave rolling" effect by virtue of which the waves cause the oysters to rub against one another, which polishes their surface;
  second, the periods of mechanical dewatering last between 12 hours and 24 hours, and a period of immersion between two periods of mechanical dewatering lasts between three days and seven days.

The refining step 300 lasts for a total of between seven days and four months, depending on the weather conditions (according to whether there are more waves or fewer waves giving rise to more or less effective wave rolling in a natural environment).

In a variant, the refining step 300 may take place with the second range oysters. In yet a further variant, the refining step 300 takes place without mechanical dewatering.

Lastly, the method ends with a fourth, purification step 400. In the example described here, this step takes place in an approved purification center. At this stage, the adult oysters weigh between 45 g and 85 g in the case of the first variety of oysters, and between 90 g and 400 g in the case of second variety of oysters. Purification takes place by immersion in a purification bath, for a duration of between one day and five days, in accordance with biotic quality.

In the aforesaid, two particular examples have been described relating to two varieties of oyster cultivated in the Mediterranean climate of Thau lagoon in the south of France. Further variants adapted to diverse conditions will occur to a person skilled in the art within the scope of the claims below.

The alternation of periods of immersion and periods of mechanical dewatering plays a particularly important role and makes it possible to obtain oysters with thicker mother of pearl that has specific color characteristics. The thickness of the mother of pearl makes it possible, in particular, to protect the oyster against the formation of bioorganic pockets. Generally speaking, the Applicant has discovered that the controlled cycles of mechanical dewatering make it possible to make the oysters not only finer but also more resistant.

Furthermore, the method described here makes it possible to obtain hitherto unachieved "IQ" (ratio between mass of flesh and total weight) and IR (ratio between mass of flesh and shell weight) values. By way of comparison, a Bouzigues oyster, cultivated on a site similar to that of the first variety of oysters, has on average an "IQ" value of 7.0% and an "IR" value of 15.3% as compared to, respectively, an "IQ" value of 10.1% and an "IR" value of 24.3% in the case of an oyster produced in accordance with the method described here. With the second variety of oysters, the difference is even more marked: the "IQ" value is 13.5% and the "IR" value 39%.

Table 1 below summarizes certain characteristics of oysters produced at various sites in comparison to those of oysters produced in accordance with the method described here.

As can be seen from Table 1, the second variety oysters have qualities similar to those of Gilardeau (registered trademark) oysters, but with a much higher muscle mass/flesh mass ratio of 19.9% as opposed to 10.2%, which makes the oysters more resistant and imparts better flavor to them. Furthermore, oysters obtained from the method described here are all polished, which makes them less dangerous to handle. Similarly, the first variety oysters have remarkable qualities, given their short cultivation cycle.

The aforesaid shows that systemization of a planned mechanical dewatering period of a significant duration makes it possible to improve the organoleptic qualities and appearance of oysters, contrary to received ideas.

This method is advantageous because it encourages the oysters to develop, as compared to oysters produced by conventional methods at a similar site, a significantly higher filling rate, with oyster flesh that has significant glycogen reserves and an adductor muscle of superior size and muscle fiber density, thicker mother of pearl and a thicker shell.

In the examples described here, the durations of the periods of mechanical dewatering vary between 12 hours and 24 hours. More generally, the durations of the periods of mechanical dewatering may vary between 3 hours and 48 hours, depending on oyster characteristics and the characteristics of the cultivation site. In the examples described here, the periods of immersion between two periods of mechanical dewatering last between one day and seven days. More generally, the periods of immersion between two periods of mechanical dewatering last between 3 hours and seven days.

Depending on places of cultivation, climate, and the variety of oyster sought, the following parameters may be varied:
the duration of the periods of mechanical dewatering,
the duration of the periods of immersion between two periods of mechanical dewatering,
the total duration of the cultivation step,
the number of substeps in the cultivation step and the order in which they are implemented.

It is pointed out that the fact that a limited number of mechanical dewatering or immersion periods may have a duration outside of the ranges set out in the claims below does not constitute a departure from the scope of said claims.

TABLE 1

| Characteristic | Second variety | First variety | Normandie (origin) | Gilardeau (registered trademark) | Bouzigues (origin) |
|---|---|---|---|---|---|
| IQ | 13.5% | 10.1% | 9.3% | 12.7% | 7.0% |
| IR | 39% | 24.3% | 30.4% | 39.2% | 15.3% |
| Muscle mass/Total mass | 2.7% | 0.6% | Not available | 1.3% | 0.6% |
| Muscle mass/Flesh mass | 19.9% | 5.7% | Not available | 10.2% | 8.1% |
| Shell thickness | +++ | +++ | + | ++ | ++ |
| Polished | yes | yes | no | no | No |
| Inside shell | Mother of pearl complete and rainbow hues The blade cannot be put in No pocket or worm | Mother of pearl complete and rainbow hues The blade cannot be put in No pocket or worm | Mother of pearl not complete The blade can be put in Pockets, worm or other, on occasion Possibility of sludge | Mother of pearl complete and rainbow hues, but irregular, depending on oysters Possibility of sludge | Mother of pearl not complete The blade can be put in Pockets, worm sometimes |

The invention claimed is:

1. An oyster farming method, comprising a preliminary maturation step for oysters that is carried out until the oysters have a size of between approximately 15 mm and 80 mm, at least one cultivation step which is subsequent to the preliminary maturation step, the cultivation step comprising alternating periods of immersion and periods of mechanical dewatering of the oysters, wherein the periods of mechanical dewatering last between 3 hours and 48 hours, and wherein a period of immersion between two periods of mechanical dewatering lasts between 3 hours and seven days.

2. The method as claimed in claim 1, wherein the periods of mechanical dewatering last between 12 hours and 24 hours.

3. The method as claimed in claim 1, wherein a period of immersion between two periods of mechanical dewatering lasts between one day and seven days.

4. The method as claimed in claim 1, wherein the cultivation step comprises a succession of substeps lasting a total of between approximately ten months and forty-eight months, and in each of which the duration of a period of immersion between two periods of mechanical dewatering is adapted to the climate of the place of cultivation.

5. The method as claimed in claim 4, wherein, when the climate of the place of cultivation is a Mediterranean climate, the duration of a period of immersion between two periods of mechanical dewatering of each substep is chosen as follows:
   a. for a first substep, between four days and seven days, then
   b. for a second substep, between three days and five days, then
   c. for a third substep, between one day and three days, then
   d. for a fourth substep, between three days and four days.

6. The method as claimed in claim 4, wherein the substeps are repeated in the same order.

7. The method as claimed in claim 1, wherein the cultivation step takes place over a total period of between ten months and eighteen months.

8. The method as claimed in claim 1, wherein the duration of a period of immersion between two periods of mechanical dewatering is extended when one or more of the following conditions is or are met:
   rain and/or storm,
   wind above 30 knots,
   below 20% sunshine.

9. The method as claimed in claim 1, wherein a refining step takes place after the cultivation step, wherein periods of immersion take place such that the oysters are located at a depth of between 10 cm and 30 cm below the surface.

* * * * *